(12) United States Patent (10) Patent No.: US 8,201,203 B2
Vitito (45) Date of Patent: Jun. 12, 2012

(54) HEADREST MOUNTED VEHICLE ENTERTAINMENT SYSTEM WITH AN INTEGRATED COOLING SYSTEM

(75) Inventor: Christopher J. Vitito, Celebration, FL (US)

(73) Assignee: Audiovox Corporation, Hauppauge, NY (US)

( * ) Notice: Subject to any disclaimer, the term of this patent is extended or adjusted under 35 U.S.C. 154(b) by 1234 days.

(21) Appl. No.: 11/153,363

(22) Filed: Jun. 16, 2005

(65) Prior Publication Data

US 2006/0284435 A1 Dec. 21, 2006

(51) Int. Cl.
*H04N 7/18* (2006.01)
(52) U.S. Cl. ............... 725/75; 348/748; 297/180.14; 297/217.1; 297/217.3; 297/217.4; 361/679.49
(58) Field of Classification Search .................. 725/75; 348/748; 297/180.14, 217.1, 217.3, 217.4
See application file for complete search history.

(56) References Cited

U.S. PATENT DOCUMENTS

| | | | |
|---|---|---|---|
| 4,710,851 A | 12/1987 | Pastecki | |
| 5,450,894 A | 9/1995 | Inoue et al. | |
| 5,842,715 A | 12/1998 | Jones | |
| 5,959,836 A | 9/1999 | Bhatia | |
| 5,969,939 A | 10/1999 | Moss et al. | |
| 6,259,601 B1 | 7/2001 | Jaggers et al. | |
| 6,674,640 B2 | 1/2004 | Pokharna et al. | |
| 6,899,365 B2 | 5/2005 | Lavelle et al. | |
| 7,075,034 B2 * | 7/2006 | Bargheer et al. | 219/202 |
| 7,212,403 B2 * | 5/2007 | Rockenfeller | 361/679.47 |
| 2003/0184137 A1 | 10/2003 | Jost | |
| 2004/0227696 A1 * | 11/2004 | Schedivy | 345/7 |
| 2005/0200697 A1 | 9/2005 | Schedivy et al. | |

FOREIGN PATENT DOCUMENTS

| | | |
|---|---|---|
| FR | 2801854 | 6/2001 |
| FR | 2817812 | 6/2002 |
| WO | WO 02073574 | 9/2002 |
| WO | WO 03/106215 A1 * | 12/2003 |

* cited by examiner

*Primary Examiner* — Scott Beliveau
*Assistant Examiner* — Kunal Langhnoja
(74) *Attorney, Agent, or Firm* — F. Chau & Associates, LLC

(57) ABSTRACT

An entertainment system includes a video system mounted within an automobile headrest, the headrest including a headrest body in which the video system is mounted. A cooling system is integrated with the headrest for maintaining the video system at a desirable temperature.

15 Claims, 8 Drawing Sheets

HEADREST MOUNTED VEHICLE ENTERTAINMENT SYSTEM WITH AN INTEGRATED COOLING SYSTEM

BACKGROUND OF THE INVENTION

1. Field of the Invention

The invention relates to a vehicle entertainment system. More particularly, the invention relates to a headrest mounted automobile entertainment system employing an airflow system for cooling of the entertainment system.

2. Description of the Prior Art

Entertainment systems for automobiles are well known. As such, many advances have been made in the development of entertainment systems that make the otherwise tedious task of driving in an automobile more bearable. In addition to the development of overhead systems pioneered by the present inventor, systems that mount within the headrest of an automobile have also been developed.

These headrest entertainment systems allow multiple individuals to view a variety of different video screens within the same vehicle. However, and as those skilled in the art will certainly appreciate, cooling of entertainment systems mounted with the headrest is very difficult, although absolutely necessary for proper operation of the entertainment system. As such, a need exists for an improved headrest mounted entertainment system that provides for the cooling thereof in an efficient and reliable manner. The present invention provides such a system.

SUMMARY OF THE INVENTION

It is, therefore, an object of the present invention to provide an entertainment system including a video system mounted within an automobile headrest, the headrest including a headrest body in which the video system is mounted. A cooling system is integrated with the headrest for maintaining the video system at a desirable temperature.

It is also an object of the present invention to provide an entertainment system wherein the video system includes an integrated video source.

It is another object of the present invention to provide an entertainment system wherein the video source is a DVD player.

It is a further object of the present invention to provide an entertainment system wherein the video source is a hard drive.

It is also another object of the present invention to provide an entertainment system wherein the cooling system includes an inlet conduit and an outlet conduit for facilitating the flow of air to and from the video system.

It is yet another object of the present invention to provide an entertainment system wherein the inlet conduit includes a fan.

It is still a further object of the present invention to provide an entertainment system wherein the outlet conduit includes a fan.

It is also an object of the present invention to provide an entertainment system wherein the cooling system includes an inlet conduit and an outlet conduit for facilitating the flow of air to and from the video system.

It is another object of the present invention to provide an entertainment system wherein the video system includes a housing and the cooling system is linked to the housing for providing a supply of cooling air therethrough.

Other objects, advantages and salient features of the invention will become apparent from the following detailed description, which taken in conjunction with the annexed drawings, discloses a preferred, but non-limiting, embodiment of the subject invention.

DESCRIPTION OF THE PREFERRED EMBODIMENTS

Figure 1:
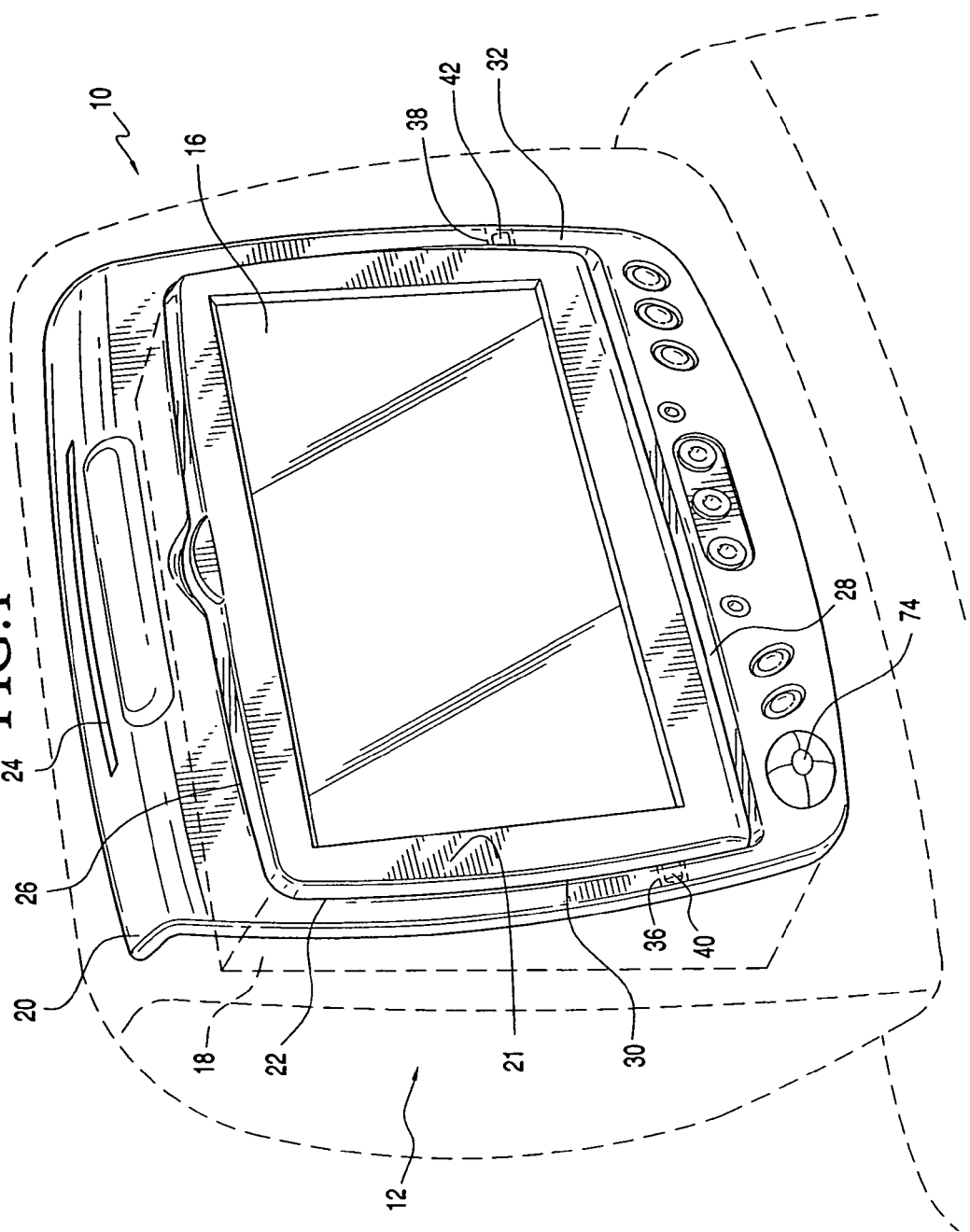
FIG. 1 is a front perspective view of an automobile entertainment system in accordance with the present invention.
Figure 2:
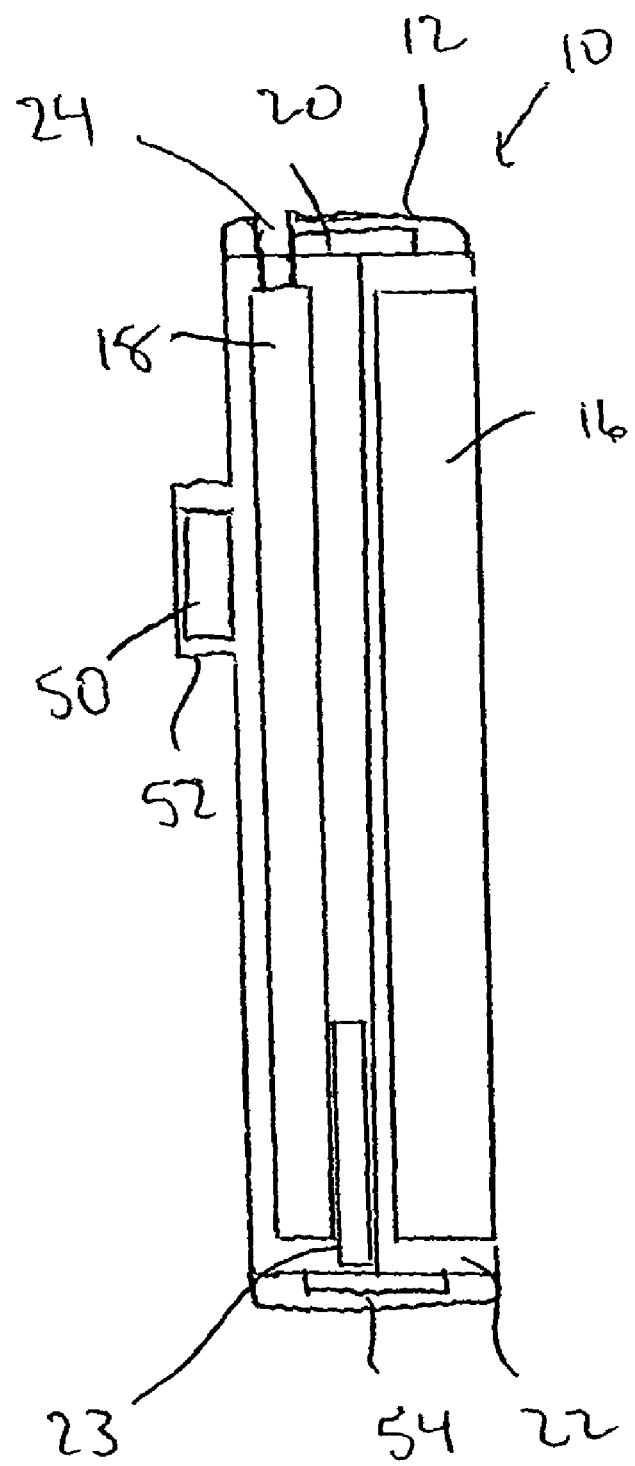
FIG. 2 is a cross sectional view of the housing of the video system shown in FIG. 1.

The detailed embodiments of the present invention are disclosed herein. It should be understood, however, that the disclosed embodiments are merely exemplary of the invention, which may be embodied in various forms. Therefore, the details disclosed herein are not to be interpreted as limiting, but merely as the basis for the claims and as a basis for teaching one skilled in the art how to make and/or use the invention.

With reference to the various figures, an automobile entertainment system 10 is disclosed. The automobile entertainment system 10 is composed of a series of video and audio components integrated within an automobile. In particular, the entertainment system 10 includes a video system 12 mounted within a standard headrest 14 of an automobile. The video system 12 generally includes a video monitor 16 for presenting video content and a video source 18 integrated therewith. While the system is described herein as being for use in an automobile, those skilled in the art will appreciate the system could be used in a variety of vehicles, for example, boats or planes, without departing from the spirit of the present invention.

In accordance with a preferred embodiment, the video monitor is a TFT LCD screen. However, it is contemplated that other monitor constructions, for example, plasma, Ultra High Definition VGA, touch screen VGA, organic LED, fabric based monitors (e.g., flexible TFT), etc., may be used without departing from the spirit of the present invention.

In accordance with a preferred embodiment of the present invention, the video source 18 is a DVD player coupled to the video monitor 16 for the transmission of video content thereto. That is, the DVD player 18 (or other video source) is integrated within the same video housing 20 as the video monitor 16. It is also contemplated that a hard drive 98 video source may also be integrated with the video monitor 16. As those skilled in the art will certainly appreciate, the hard drive 98 will include inputs for receiving video content and outputs for transmitting video content to the video monitor 16, both of which are well known to those skilled in the art. However, those skilled in the art will appreciate that the video source may take a variety of forms without departing from the spirit of the present invention; for example, and not limited to, satellite video systems and Bluetooth wireless based systems.

The housing 20 includes a recess 22 shaped and dimensioned for accommodating the video monitor 16. The video system 12 is mounted along the rear portion of the headrest 14 such that an individual sitting in the rear seat of the automobile may watch the material presented on the video monitor 16 without disturbing the driver of the automobile.

The video monitor 16, DVD player 18, hard drive 98 and associated control components are mounted within the housing 20. As those skilled in the art will certainly appreciate, the video monitor 16 is mounted for viewing via the recess 22 in the housing 20. With regard to the DVD player 18, it is integrally molded within the housing 20 and positioned for insertion of the DVDs within a slot 24 behind the video monitor 16. By mounting the DVD player 18 in this way, a stable structure is developed that is well adapted for the automobile environment.

Figure 3:
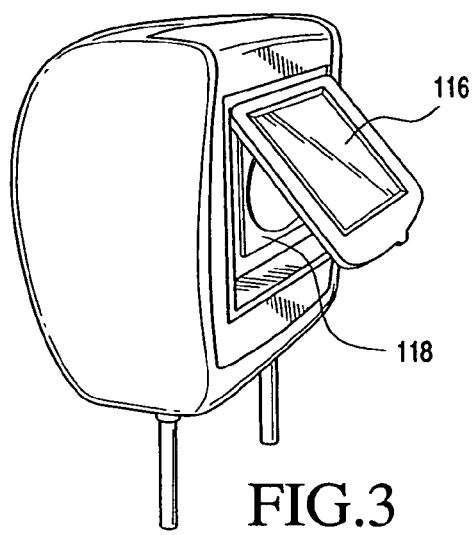
FIGS. 3, 4, 5 and 6 are views of entertainment systems in accordance with alternate embodiments of the present invention.
Figure 4:
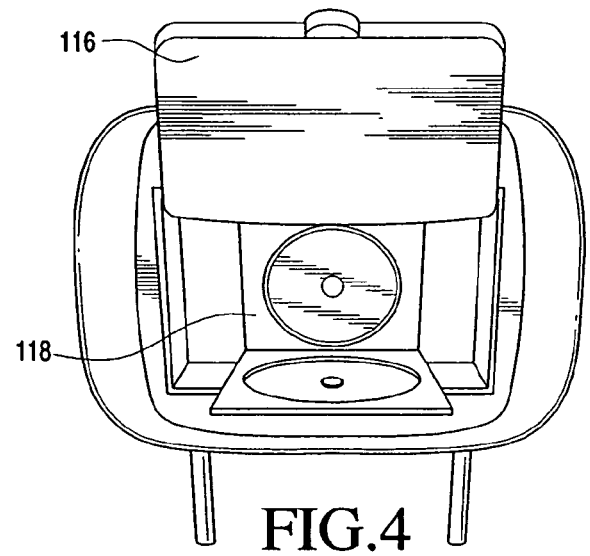
Figure 5:
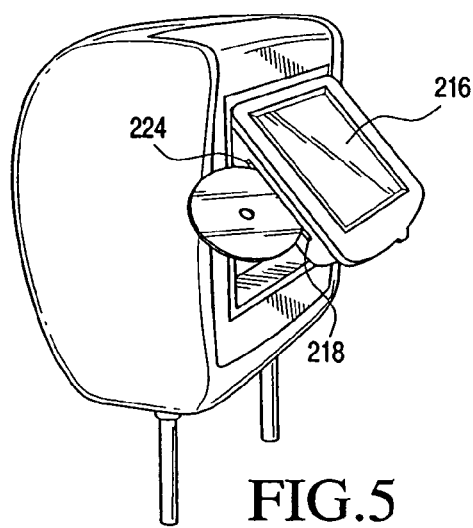
Figure 6:
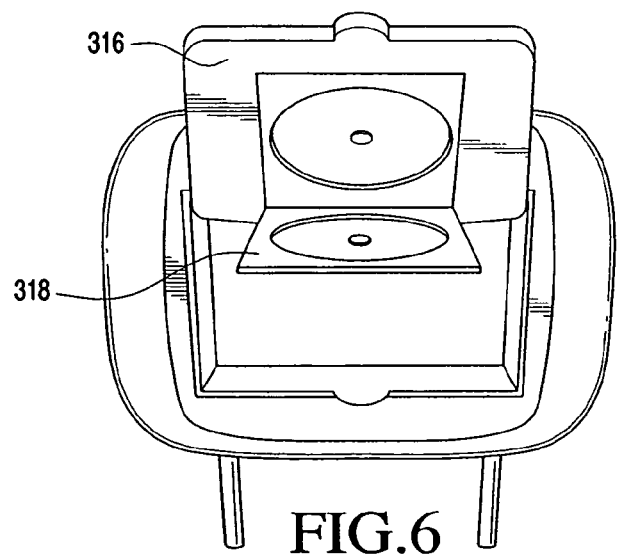
Figure 8:
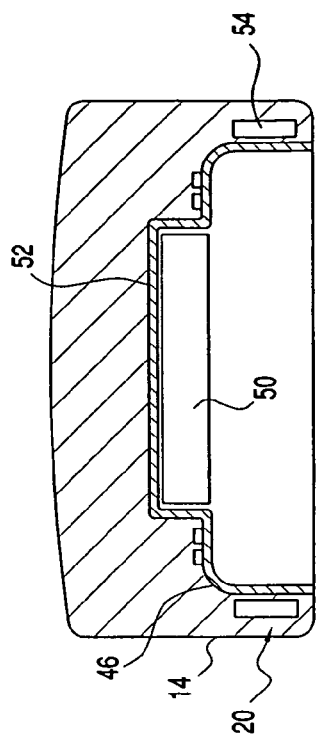
FIGS. 7, 8 and 9 are various views of the housing employed in accordance with the present invention.
Figure 9:
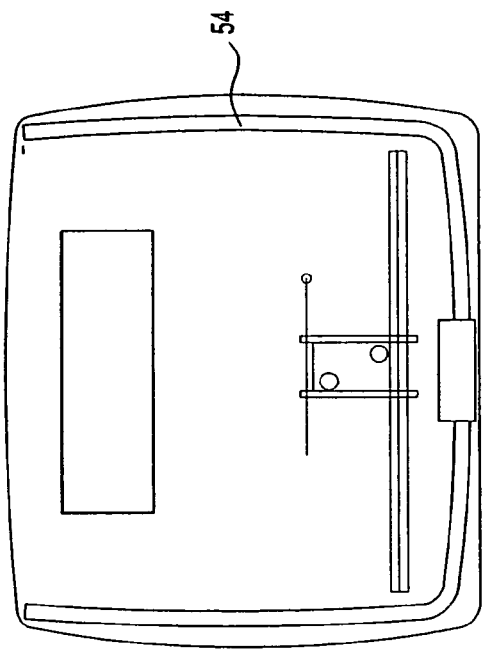
Figure 7:
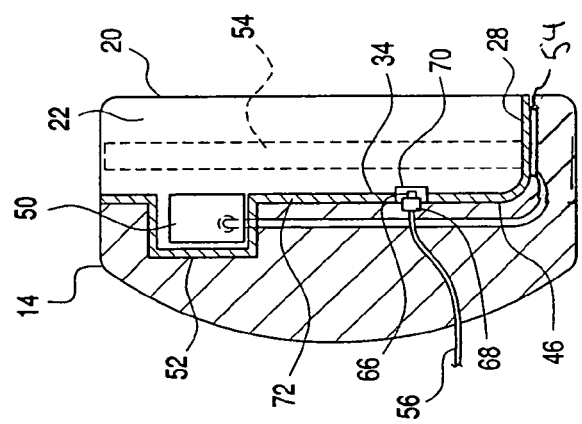
Figure 10:
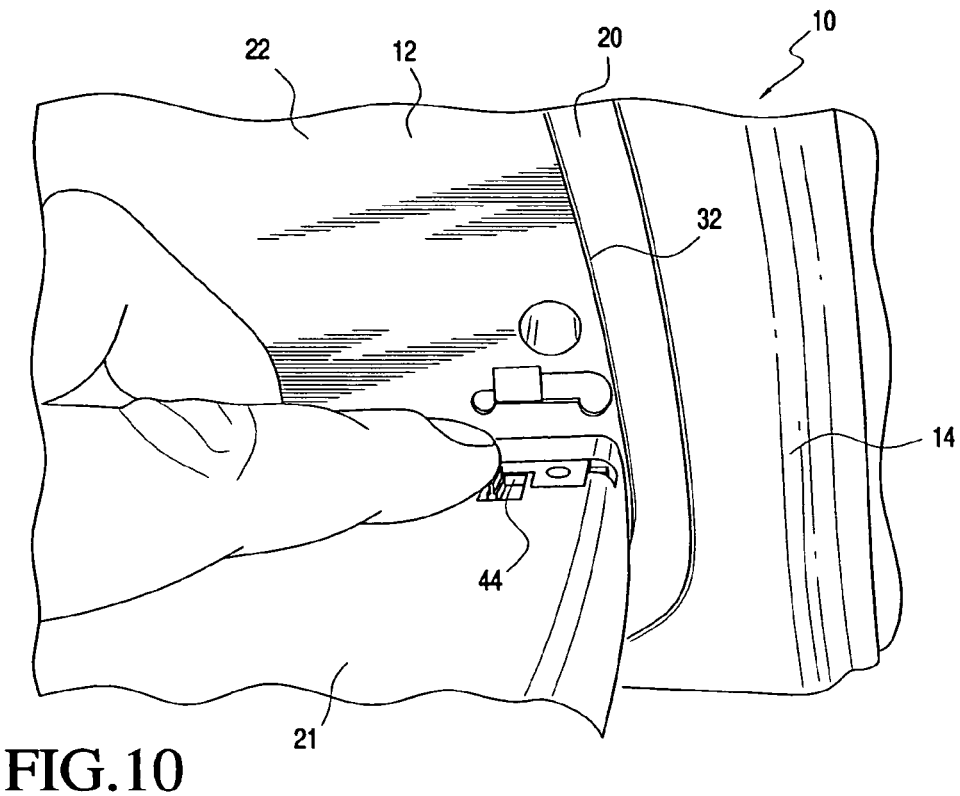
FIGS. 10, 11, 12 and 13 are perspective views showing detachment of the video system from a headrest in accordance with the present invention.
Figure 11:
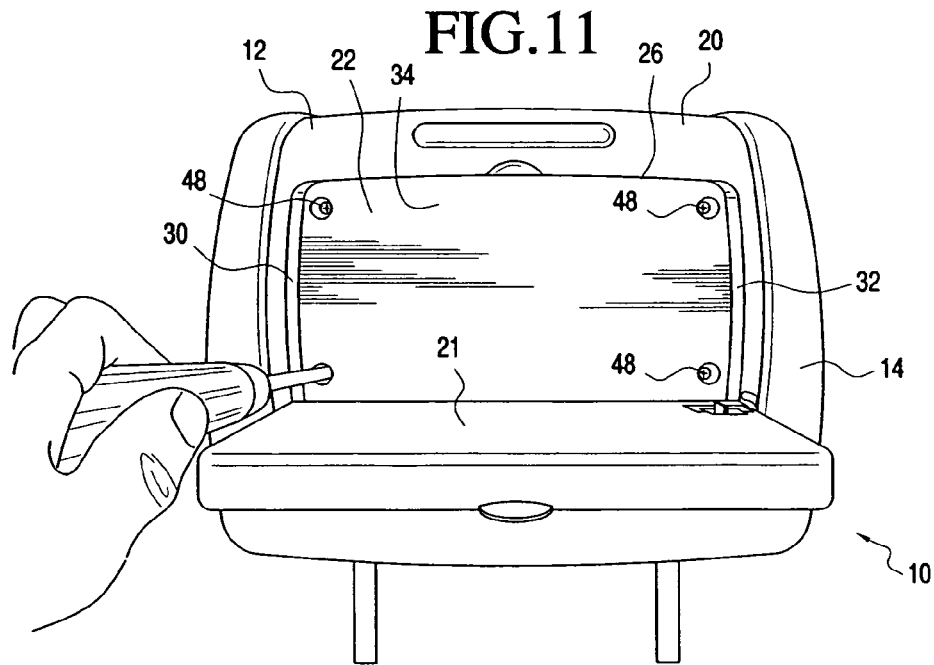
Figure 12:
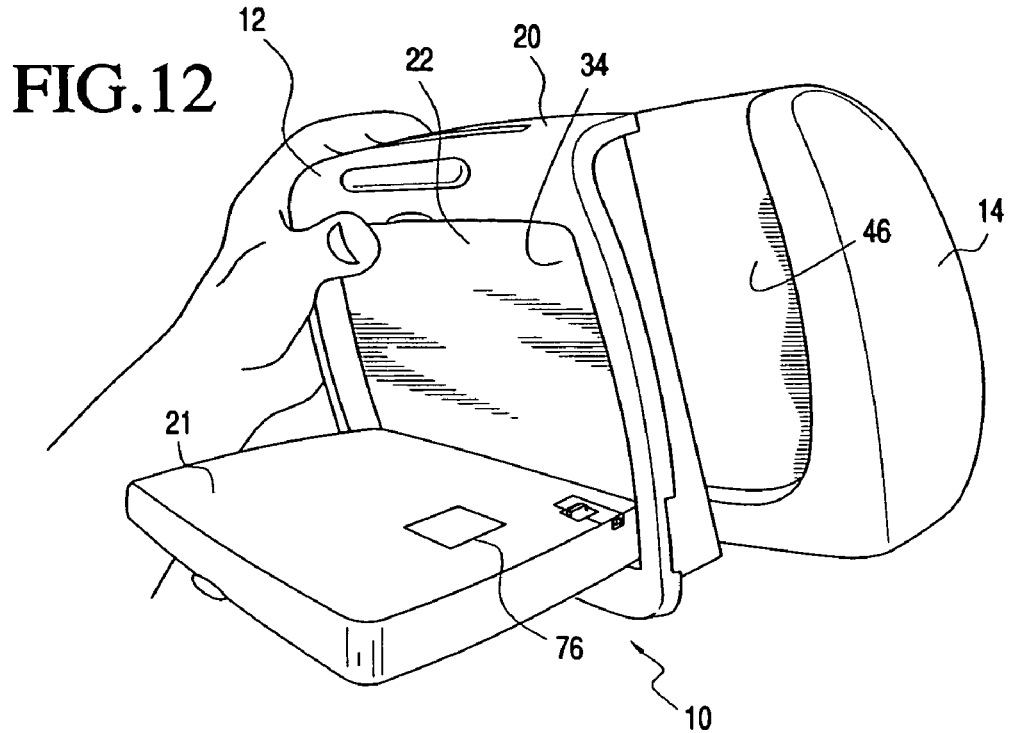
Figure 13:
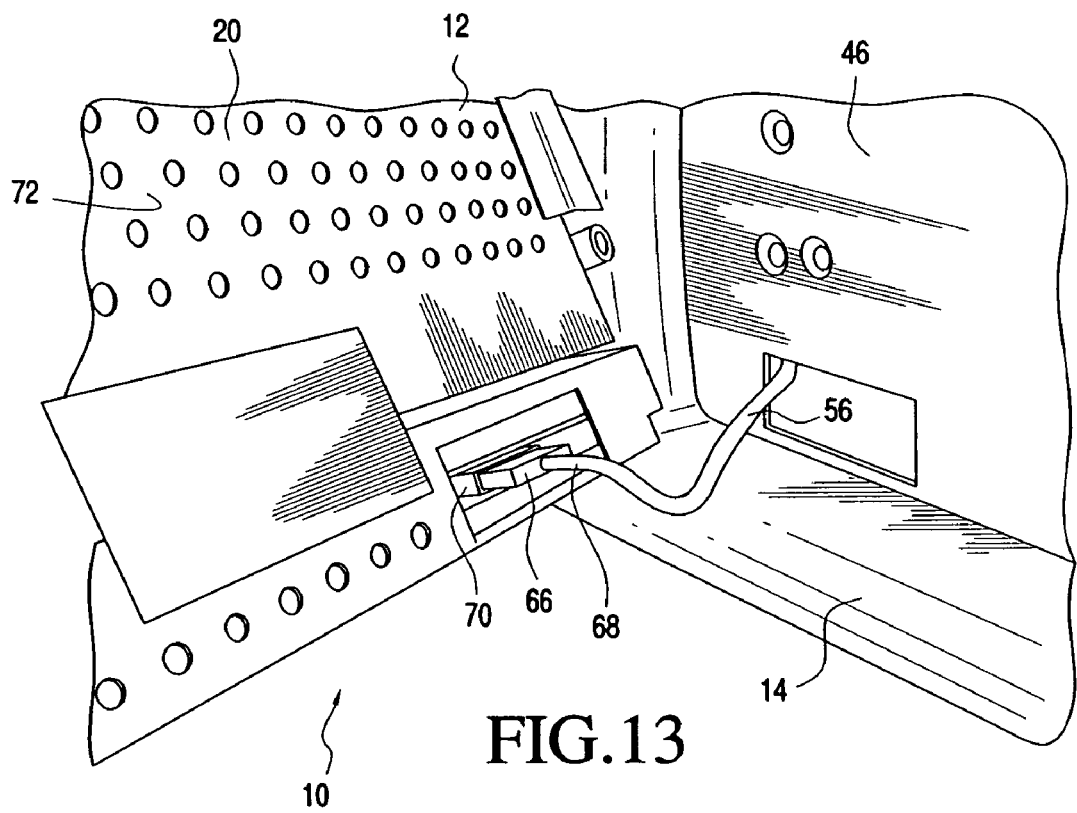
Figure 14:
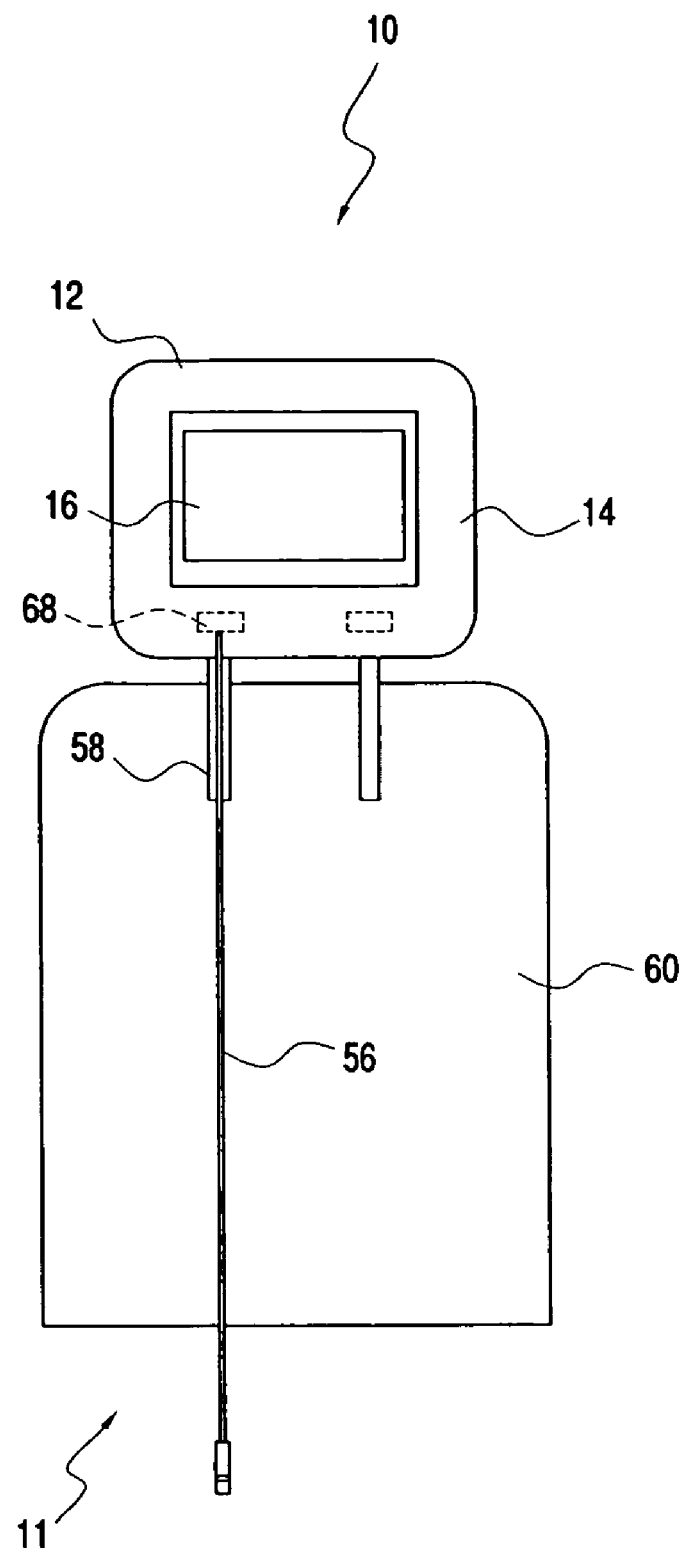
FIG. 14 is a schematic showing wiring of the present entertainment system.

While the DVD player 18 is disclosed as being a slot-loaded design with insertion behind the video monitor, the DVD player could take a variety of other forms while still being integrated with the video monitor. With reference to FIGS. 3 and 4, the DVD player 118 may be positioned beneath the pivotally mounted video monitor 116. With reference to FIG. 5, the DVD player 218 may be integrated with the video monitor 216 and facilitate access via a side loading slot 224. Referring to FIG. 6, the DVD player 318 is integrated within the underside of the video monitor and the DVD is snapped into the DVD player when the monitor 316 is pivoted upward.

With reference to FIGS. 2 and 7 through 9, the housing 20 for the present video system 12 is disclosed. The housing 20 includes a recess 22 in which the video monitor 16, that is, the video monitor housing 21, is pivotally mounted. More specifically, the recess 22 is a generally rectangular shell in which the video monitor housing 21 is mounted. The recess 22 includes a top wall 26 and a bottom wall 28 connected by first and second sidewalls 30, 32. The recess 22 also includes a rear wall 34.

The first and second sidewalls 30, 32 are respectively provided with bearing slots 36, 38 shaped and dimensioned for receiving lateral posts 40, 42 extending from the sides of the video monitor housing 21. The lateral posts 40, 42 are preferably positioned adjacent the base of the video monitor housing 21 and the bearing slots 36, 38 are similarly positioned for receiving the posts 40, 42. In this way, the lateral posts 40, 42 are mounted within the bearing slots 36, 38 permitting controlled pivoting of the video monitor housing 21 within the recess 22.

The controlled movement of the video monitor housing 21 within the recess 22 is limited by the inclusion of a stop member 44 positioned between the video monitor housing 21 and the second sidewall 32. The stop member 44 limits movement to approximately 30 degrees of forward rotation. However, the stop member 44 may be moved between an obstruction position and a release position to permit selective full forward rotation of the video monitor housing 21 relative to the housing 20. When the stop member 44 is moved in this way, the video monitor housing 21 may be rotated fully forward making the recess 22 fully accessible for reasons that will be discussed below in greater detail.

The housing 20 is mounted within a headrest recess 46 shaped and dimensioned for receiving the housing 20 such that it is flush with the surface of the headrest 14. In accordance with a preferred embodiment of the present invention, four screws 48 are used in screwing the housing 20 within the headrest recess 46, and securing the housing 20 and video monitor 16 to the headrest.

In addition, and in accordance with a preferred embodiment, a broadcast television receiver 50 is integrated with the video monitor 16 and/or the headrest 14. More particularly, and with reference to FIGS. 2, 7, 8 and 9, the housing 20 is provided with a television receiver rear recess 52 shaped and dimensioned for receiving a television receiver 50. The television receiver 50 may, therefore, be wired for use in conjunction with the video monitor 16 in a manner known to those skilled in the art.

The television receiver 50 is further provided with an antenna 54. The antenna 54 is electrically connected to the television receiver 50 for the transmission of over-the-air signals. The antenna 54 is substantially U-shaped and is wrapped about the housing 20. While a U-shaped antenna wrapped about the housing is disclosed in accordance with a preferred embodiment of the present invention, the antenna may be oriented within a variety of locations within the headrest without departing from the spirit of the present invention.

Although a traditional television receiver is disclosed above in accordance with a preferred embodiment of the present invention, the video system may be modified to include satellite television reception or digital television reception without departing from the spirit of the present invention.

Figure 15B:
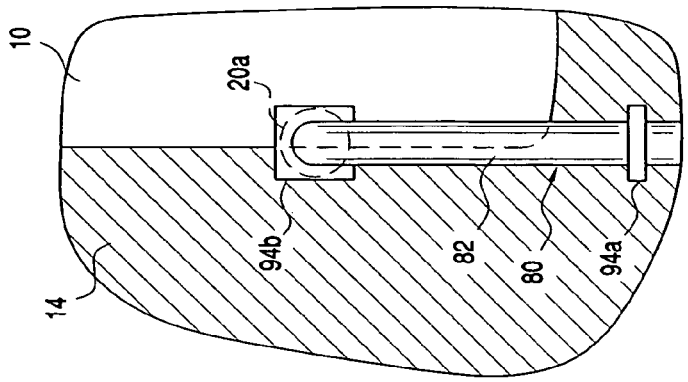
FIGS. 15a and 15b are respectively a perspective view and a cross sectional view showing the cooling system employed in accordance with the present invention.
Figure 15A:
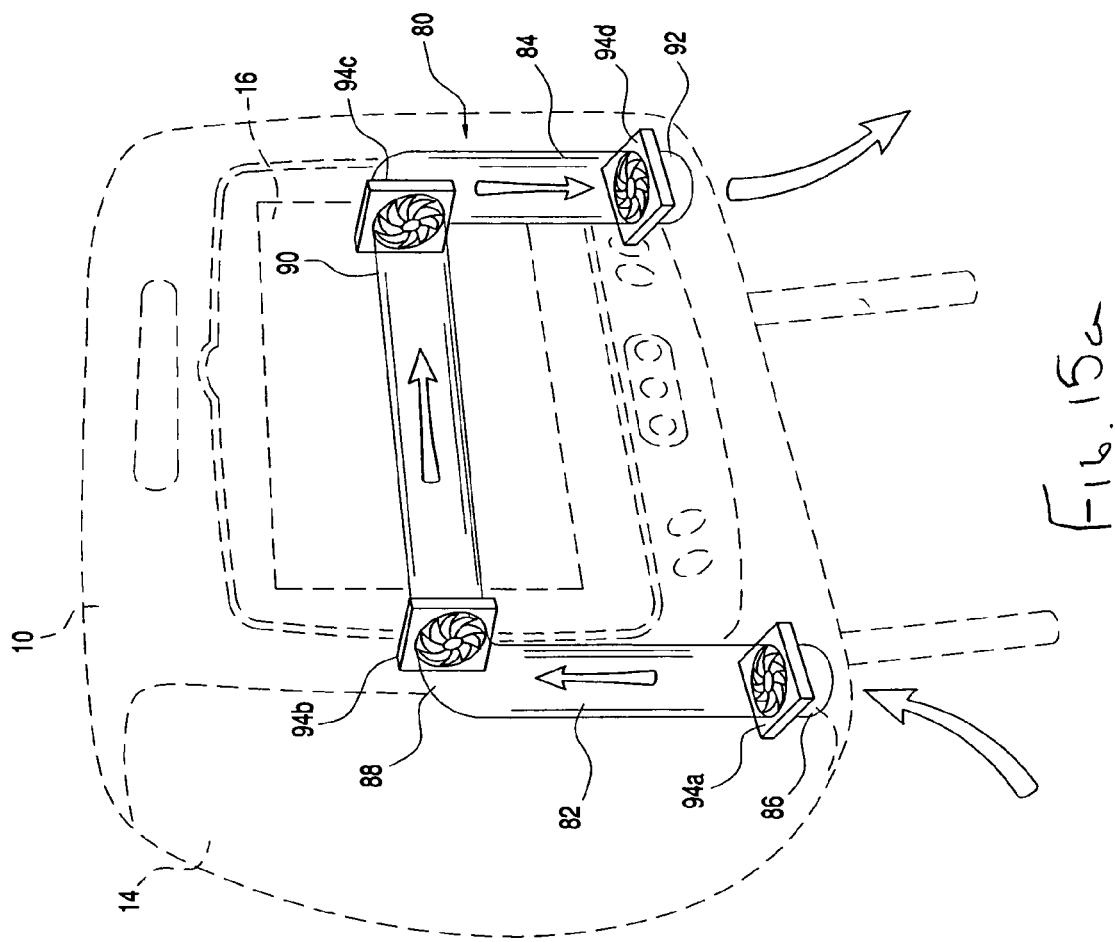

Referring to FIGS. 15a and 15b, cooling of the monitor 16, DVD player 18 and other electronic components of the present automobile entertainment 10 is achieved by the cooling system 80 incorporated into the headrest 14. The cooling system 80 includes an inlet conduit 82 and an outlet conduit 84 positioned on opposites sides of the housing 20. The inlet conduit 82 and outlet conduit 84 are in fluid communication with the housing 20 such that air may freely flow from the inlet conduit 82, through the housing 20 and out the outlet conduit 84.

The inlet and outlet conduits 82, 84 are formed within the body of the headrest 14 for fluid communication with the housing 20. With this in mind, the housing 20 and the associated electronic components housed therein are oriented to allow for the free flow if air, or other cooling medium, from one side of the housing to the other side of the housing. More particularly, the inlet conduit 82 includes a first end 86 and a second end 88. The first end 86 is positioned adjacent the external surface of the headrest 14 for drawing cool air into the cooling system 80 and the second end 88 is positioned adjacent to, and in contact with, an aperture 20a within the housing 20 for delivering cool air thereto. In addition, the outlet conduit 84 includes a first end 90 and a second end 92. The first end 90 is positioned adjacent to, and in contact with, an aperture 20b within the housing 20 opposite the position at which the second end 88 of the inlet conduit 82 is coupled. The first end 90 of the outlet conduit 84 is coupled to the housing 20 for drawing heat from the entertainment system 10 by continuing the flow of air from the inlet conduit 82. The second end 92 of the outlet conduit 84 is adjacent the external surface of the headrest 14 for delivering warmed air to the ambient environment.

The housing 20 of the present video system is constructed with a sufficiently open structure to permit the free flow of air from one side thereof to the other side thereof. In particular, the airflow moves past the DVD control board and the other electronic circuit boards used in operation of the present video system 12.

As those skilled in the art will certainly appreciate, the orientation of the inlet conduit 82 and outlet conduit 84 may be varied to suit specific headrest constructions without departing from the spirit of the present invention. For example, it is contemplated the inlet conduit and outlet conduit may extend along the space defined by the support arms of the headrest as they extend within the body of the headrest.

Use of the present cooling system 80 in conjunction with an automobile entertainment system becomes even more important in embodiments employing a hard drive 98, or other mass storage device, as a video source for operation of the video system. As those skilled in the art will certainly appreciate, hard drives 98 are capable of storing vast amounts of information allowing those within the automobile to view a variety of programs without carrying many DVDs, VCR tapes and other portable information storage devices. However, hard drives 98 generate substantial heat and the present cooling system 80 will enhance the operation of the video system 12 by maintaining the hard drive 80 and other electrical components at a desirable temperature.

The flow of air through the cooling system 80 is achieved by the placement of fans within either, or both, of the inlet and outlet conduits 82, 84. In accordance with a preferred embodiment, fans 94*a-d* are positioned along both the inlet conduit 82 and outlet conduit 84 to ensure a full flow of cooling air through the entertainment system 10. Power to the fans 94*a-d* is provided via a linkage to the power source (not shown) of the entertainment system 10.

As disclosed above in accordance with a preferred embodiment of the present invention, the air flow of the present cooling system 80 follows a generally U-shaped pathway. However, and as those skilled in the art will certainly appreciate, the flow may take various paths, for example, straight through the headrest, without departing from the spirit of the present invention.

As briefly mentioned above, the video system 12 is mounted within the headrest 14. As those skilled in the art will readily appreciate, the video system 12 is provided with inputs and outputs for audio and video. A multi-wire cable 56 extends from the output of the video system 12. The wires making up the multi-wire cable 56 include those for a power supply and the left and right audio outputs used in providing audio to an alternate audio system, for example, a wireless RF transmitter (not shown) used in transmitting sound to the vehicle audio system. The video system 12 is electrically connected to the remainder of the automobile 11 and a wireless RF transmitter (not shown) via electrical communication lines of the multi-wire cable 56 extending through the extension arm 58 of the headrest 14 and the back of the vehicle seat 60. For example, a power source wire and audio output wires are respectively connected to the video system 12 in accordance with a preferred embodiment of the present invention.

In order to facilitate ease of installation, and with reference to FIGS. 10 through 14, the multiple wires required for the power source and audio outputs are maintained within the single multi-wire cable 56. The multiple wires are passed through a single extension arm 58 of the headrest 14 with the chosen extension arm functioning as a conduit for running the multi-wire cable 56 from the video system 12 to the remainder of the automobile.

The multi-wire cable 56 includes a male jack 66 at its first end 68. The male jack 66 is in communication, with the electrical components (for example, power supply and audio outputs) of the video system 12 and is adapted for selectively attachment to a female jack 70 formed in the back wall 72 of the housing 20. In accordance with a preferred embodiment of the present invention, traditional jacks are employed and a variety of jack structures may be employed without departing from the spirit of the present invention. In this way, the video system 12, and particularly, the housing 20, is readily detached from the external wiring of the system 10 in a manner permitting ready detachment and attachment of the video system 12 when one needs to remove the housing 20 from the headrest 14 for repair or replacement thereof.

More particularly, when one wishes to remove the housing 20, and consequently the video monitor 16 and DVD player 18, the video monitor 16 is first rotated forward and the stop member 44 is moved to the release position permitting full forward rotation of the video monitor 16. The video monitor 16 may, therefore, be fully rotated forward, exposing the four screws 48 holding it within the headrest recess 46. Once the four screws 48 are removed, the housing 20 may be lifted from within the headrest recess 46, the male jack 66 of the multiwire cable 56 removed from the back wall 72 of the video system 12 and the entire video system 12 withdrawn for repair or replacement.

Passage of the multi-wire cable through the headrest extension arm and the back of the vehicle seat is described in U.S. patent application Ser. No. 10/920,431, entitled "Automobile Entertainment System" which is incorporated herein by reference.

Control of the video system 12, including the video monitor 16, DVD player 18, hard drive 98 and other components of the video system 12, is facilitated by the provision of control buttons 74 along the outer surface of the video system 12. In accordance with a preferred embodiment of the present invention, the control buttons 12 take the form of a multifunction controller permitting movement of a cursor shown upon various interfaces displayed upon the video monitor 16. In addition, conventional control buttons may also be provided for control of traditional functions. In addition to the provision of manual control buttons, the video system may further include a remote control (not shown) such that an individual need not actually touch the video system to control the video content or the volume generated by the video system. Once again, and as those skilled in the art will certainly appreciate, a variety of remote control systems may be utilized without departing from the spirit of the present invention.

The present video system 12 is provided with the ability to offer a variety of functionalities. These functionalities may be hardwired or programmed within the video system or the functionalities may be added in a modular manner via an expansion slot 76 provided within the video system 12. Contemplated functionalities include, but are not limited to satellite radio (for example, Serius, XM), Pictel phone, satellite television (for example, DirecTV), GPS guidance systems, quick release battery packs, memory cards, wireless internet access (for example, Wi-Fi), Bluetooth, digital video recorders, digital video reception and recording, digital video inputs, video conferencing, cellular digital, cellular digital with a camera, USB capabilities, Blue sphere, hot swap hard drive, satellite video import card, wireless video import card, etc.

While the preferred embodiments have been shown and described, it will be understood that there is no intent to limit the invention by such disclosure, but rather, is intended to cover all modifications and alternate constructions falling within the spirit and scope of the invention as defined in the appended claims.

The invention claimed is:

1. An entertainment system, comprising:
   a video system mounted within an automobile headrest, the headrest including a headrest body in which the video system is mounted; and
   a cooling system integrated with the headrest for maintaining the video system at a desirable temperature, the cooling system includes an inlet conduit and an outlet conduit in fluid communication with the video system such that air may freely flow from the inlet conduit, through the video system and out the outlet conduit, the inlet conduit and the outlet conduit are respectively formed within the headrest body for fluid communication with the video system, wherein the inlet conduit includes a first end located in a bottom surface of the automobile headrest adjacent to a first extension arm of the automobile headrest for drawing cool air into the cooling system to flow through and cool the video system and a second end which is positioned opposite the first end and wherein the outlet conduit includes a first end and a second end which is positioned opposite to the first end of the outlet conduit and in the bottom surface of the automobile headrest adjacent to a second extension arm of the automobile headrest for delivering the cooling air flowing through the video system to outside of the headrest and a first fan positioned in the inlet conduit adjacent to the first end of the inlet conduit and a second fan positioned in the outlet conduit adjacent to the second end of the outlet conduit.

2. The entertainment system according to claim 1, wherein the video system includes an integrated video source.

3. The entertainment system according to claim 2, wherein the video source is a DVD player.

4. The entertainment system according to claim 2, wherein the video source is a hard drive.

5. The entertainment system of claim 1, wherein the a portion of the inlet conduit and a portion of the outlet conduit are substantially parallel to each other and to the first and second extension arms of the automobile headrest.

6. The entertainment system of claim 1, wherein the video system includes a housing and the cooling system is linked to the housing for providing a supply of cooling air therethrough.

7. An entertainment system, comprising:
a video system mounted within an automobile headrest, wherein the video system is housed within a housing mounted in the headrest body of the automobile headrest; and
a cooling system incorporated into the headrest and linked to the housing for providing a supply of cooling air therethrough for maintaining the video system mounted in the housing at a desirable temperature, the cooling system includes an inlet conduit and an outlet conduit formed on opposite sides of the housing in fluid communication with the video system such that the cooling air may freely flow from the inlet conduit, through the video system and out the outlet conduit, wherein the inlet conduit includes a first end located in a bottom surface of the automobile headrest adjacent to a first extension arm of the automobile headrest for drawing cool air into the cooling system to flow through and cool the video system and a second end positioned opposite the first end and the outlet conduit includes a first end and a second end positioned opposite to the first end of the outlet conduit and in the bottom surface of the automobile headrest adjacent to a second extension arm of the automobile headrest for delivering the cooling air flowing through the video system to outside of the headrest and a first fan positioned in the inlet conduit adjacent to the first end of the inlet conduit, a second fan positioned in the outlet conduit adjacent to the second end of the outlet conduit, a third fan positioned in the inlet conduit adjacent to the second end of the inlet conduit and a fourth fan positioned in the outlet conduit adjacent to the first end of the outlet conduit.

8. The entertainment system according to claim 7, wherein the inlet conduit and the outlet conduit of the cooling system are connected to each other in a substantially U-shaped configuration such that the air flow of the cooling system through the headrest follows a substantially a U-shaped pathway.

9. The entertainment system according to claim 7, wherein the inlet conduit and the outlet conduit of the cooling system extend along a space defined by support arms of the headrest as they extend within the headrest body.

10. The entertainment system according to claim 7, wherein power to the first fan, the second fan, the third fan and the fourth fan is provided via a linkage to a power source of the entertainment system.

11. The entertainment system according to claim 7, wherein the video system includes an integrated video source.

12. The entertainment system according to claim 7, wherein the video source is a DVD player.

13. The entertainment system according to claim 7, wherein the video source is a hard drive.

14. The entertainment system according to claim 7, wherein the second end of the inlet conduit is positioned adjacent to and in contact with a first aperture located within the housing for delivering the cooling air to the housing, and wherein the first end of the outlet conduit is positioned adjacent to, and in contact with a second aperture located within the housing opposite the position at which the second end of the inlet conduit is coupled to the outlet conduit.

15. The entertainment system of claim 7, wherein the a portion of the inlet conduit and a portion of the outlet conduit are substantially parallel to each other and to the first and second extension arms of the automobile headrest.

* * * * *